United States Patent [19]

Rozak et al.

[11] Patent Number: 5,249,510
[45] Date of Patent: Oct. 5, 1993

[54] SELF VENTING AUTOMATIC FOOD FRYING AND DISPENSING APPARATUS

[76] Inventors: Alexander T. Rozak, #1, 722 - 5A Street N.W., Calgary, Alberta, Canada, T2N 1R4; Gary G. Calderwood, 2008 - 31 Avenue S.W., Calgary, Alberta, Canada, T2T 1T2

[21] Appl. No.: 660,018

[22] Filed: Feb. 25, 1991

[51] Int. Cl.⁵ .............................................. A47J 37/12
[52] U.S. Cl. ....................................... 99/336; 99/337; 99/344; 99/403; 99/407
[58] Field of Search ................. 99/333, 331, 337, 336, 99/344, 403, 407, 409-413; 55/316, 387, DIG. 36

[56] References Cited

U.S. PATENT DOCUMENTS

| | | | |
|---|---|---|---|
| 3,818,820 | 6/1974 | Harris et al. | 99/411 |
| 3,981,232 | 9/1976 | Williamson | 99/408 X |
| 4,489,647 | 12/1984 | Stamps et al. | 55/DIG. 36 |
| 4,505,194 | 3/1985 | Bishop et al. | 99/344 |
| 4,520,717 | 6/1985 | Bohrer, Jr. et al. | 55/316 |
| 4,539,898 | 9/1985 | Bishop et al. | 99/337 |
| 4,785,725 | 11/1988 | Tate et al. | 99/331 |
| 4,852,471 | 8/1989 | Lansing | 99/330 |
| 4,854,949 | 8/1989 | Giles, Sr. et al. | 55/316 |
| 4,898,091 | 2/1990 | Rozak et al. | 99/403 |
| 4,902,316 | 2/1990 | Giles, Sr. et al. | 35/316 |

Primary Examiner—Timothy F. Simone
Attorney, Agent, or Firm—Shlesinger, Arkwright & Garvey

[57] ABSTRACT

Self venting automatic food frying and dispensing apparatus is disclosed which provides apparatus which is capable of deep frying small portions of various food products without the need for external venting and without exposing the operator to hot oil. In one embodiment, the food frying apparatus includes an upright cabinet with a fan assembly mounted to exhaust air through the top of the cabinet while drawing air in through and from the lower portion of the cabinet. A removable sealing system and a removable one piece filter is in the air path to remove smoke, odors and particulate matter from the air before being exhausted back into the room. The container for holding a supply of cooking oil is configured to minimize splashing during cooking and is a fully removable unit. Mechanism is provided for automatically loading food basket, lowering basket into cooking oil for a predetermined time and then raising the cooking basket to an unloading position and discharging the food product into a waiting receptacle. Self diagnostic features are built into the control systems.

16 Claims, 10 Drawing Sheets

SELF VENTING AUTOMATIC FOOD FRYING AND DISPENSING APPARATUS

FIELD OF THE INVENTION

The present invention refers in general to food preparation. More particularly, this invention relates to apparatus for the deep frying of food by the consumer or operator in a retail environment while essentially eliminating both the introduction of smoke and/or odor into the surrounding environment and the risk of contact of hot oil by the customer.

BACKGROUND OF THE INVENTION

Although the present invention is applicable for the deep fat frying of numerous food products, it has been found to be particularly useful in the frying of frozen french fry cut potato pieces or breaded type snack foods in a bar or fast food environment. Therefore, as not to limit the application of this invention to particular food products, the invention will be described in this environment.

Deep fat fryers are widely used in the restaurant business for cooking various food products, such as french fried potatoes, chicken, and fish. Typically, such french fryers comprise a deep tank containing a pool of cooking oil in the lower part of the tank with the cooking oil being heated by an immersed electric heating element or by a gas flame. The uncooked product is placed in a basket which is lowered into the heated oil for the desired cooking period. When the product is done, as determined by visual inspection by the restaurant employee, or by the sound of an audio timer, the basket should be removed from the oil by the employee, drained, and the product served to the customer.

With the advent of convenience stores, and the present market trends towards self serve fast food sales in these locations, the need to provide those food products mentioned above has increased. The equipment to fill this need must be safely and easily operated by the customer, reliable, easy to clean and service and not pollute the surrounding environment.

In the Prior Art, various machines are known for processing and dispensing small batches of a food product such as french fried potatoes.

U.S. Pat. No. 3,818,820 discloses an automatic machine for preparing fried potato product which includes a food hopper, a slideable ejection scoop for dispensing product into a cooking basket, a means to immerse the product in cooking oil for a predetermined time, and a means to pivot the basket and drop the potato product into a waiting container. The machine also contains a fan to extract the fumes via a replaceable charcoal filtering unit. An automatic fire extinguisher unit is mounted near the frying container to extinguish the oil if it should catch fire.

U.S. Pat. No. 3,981,232 discloses a free standing deep fat fryer with a fry container located in the interior of a cabinet. The cabinet includes an upper portion which houses a fan means for extracting air and fumes from the cabinet and forcing same through filter means which includes charcoal. A fire extinguisher is also disclosed.

U.S. Pat. No. 4,489,647 discloses an enclosed free standing deep fat fryer with a fan, filter and electrostatic precipitator means for extracting air and fumes from the cooking area. Disclosed is manually operated means for placing food products into oil, cooking those food products and delivering them back to the operator. Complex chutes and mechanical systems caused severe problems with cleaning, jamming and reliability. Filter systems were unsealed and blow by of unfiltered air occurred.

U.S. Pat. No. 4,505,194 discloses an enclosed free standing deep fat fryer with a fan, filter and electrostatic precipitator means for extracting air and fumes from the cooking area. Disclosed is motor driven means for placing food products into oil, cooking those food products and delivering them back to the operator. Complex chutes and mechanical systems caused severe problems with cleaning, jamming and reliability. Filter systems were unsealed and blow by of unfiltered air occurred.

U S. Pat. No. 4,520,717 discloses an enclosed free standing deep fat fryer with a fan and filter means for extracting air and fumes from the cooking area. Disclosed is an integral means for heating the cooking oil. A fire extinguisher is also disclosed.

U.S. Pat. No. 4,539,898 discloses an enclosed free standing deep fat fryer with a fan and filter means for extracting air and fumes from the cooking area. Disclosed is an integral means for heating the cooking oil. A means for automatically lowering a cooking basket containing food into a vat containing cooking oil for a predetermined time and then raising the cooking basket out of the oil is disclosed. A fire extinguisher is also disclosed.

U.S. Pat. No. 4,722,267 discloses an enclosed free standing coin operated french fry vending machine. Disclosed is a storage compartment for foodstuffs. A means for metering foodstuffs, immersing said foodstuffs in hot oil and dispensing said foodstuffs is also disclosed. An oil circulating, filtering, heating and replenishment system is disclosed.

U.S. Pat. No. 4,785,725 discloses an automatic cooking machine using a supply of hot cooking oil to cook food stuffs such as french fries. Disclosed is a mechanical means for collecting foodstuffs from an opened top cartridge cooking the foodstuffs and returning the foodstuffs to the opened top cartridge. A fire extinguisher is disclosed. An oil circulating, filtering, heating and replenishment system is disclosed.

U.S. Pat. No. 4,852,471 discloses a semiautomatic food frying apparatus. A particular basket design is disclosed. Air filter means is disclosed. A plate like heating means is disclosed.

U.S. Pat. No. 4,854,949 discloses a ventless exhaust system for a food cooking apparatus. Disclosed is a grease filter, an electrostatic precipitator, a flame arrestor and a fire extinguisher. A fan is also disclosed.

U.S. Pat. No. 4,898,091 and Canadian Pat. No. 1,257,103 disclose an enclosed free standing deep fat fryer with a fan and filter means for extracting air and fumes from the cooking area. A means for sealing the enclosure to ensure that all fumes pass through the filter before being allowed to exit the cooking area is also disclosed. Disclosed is an integral means for heating the cooking oil. A means for automatically lowering a cooking basket containing food into a vat containing cooking oil for a predetermined time and then raising the cooking basket out of the oil is disclosed. A fire extinguisher is also disclosed.

U.S. Pat No. 4,902,316 discloses a ventless exhaust system for a conventional oven. A fan to direct air flow is disclosed. Also disclosed are an aluminum filter, electrostatic precipitator and a charcoal filter.

The present invention as claimed is intended to solve various prior art deficiencies, related reliability problems of complex mechanisms, food storage and spoilage problems. Almost all machines have problems with pollution of the surrounding environment. In the scope of the disclosure of almost all patents in this art unit, air filters are disclosed. In most cases, the filters as disclosed fail to address the problems of physical and chemical processes that must occur to properly clean emitted fumes. The major source of pollution from this class of machines is leakage of unfiltered air around and through the filter systems and also from the cooking area. In addition, the food handling systems of many inventions as disclosed are very complex and jamming due to oil degradation and food product build up through use occurs. Food basket design as disclosed in the Prior Art fails to take into account product flow dynamics and oil surface tension problems, allowing food products to become trapped and leading to incomplete unloading of the food products. In addition, many machines do not allow simple disassembly for cleaning and easy replacement of parts.

OBJECTS AND SUMMARY OF THE INVENTION

The present invention provides a self venting automatic food frying and dispensing apparatus which may be easily and safely operated. The apparatus is small and is suitable for counter top operation. Filters, a sealing system and an air barrier system are specially designed to prevent escape of unfiltered air into the environment, and special ducting is not required. Ease of service and maintenance is achieved through an easily disassembled modular design.

Self venting automatic food frying and dispensing apparatus includes an upright cabinet. A fan assembly is mounted in the uppermost portion of the cabinet while drawing air in through the bottom portion of the cabinet. A specially configured enclosable vat serves as a ducting system to channel fumes, oil particles and smoke to the filter inlet. The duct is centrally located in the filter inlet, leaving a perimeter of filter outside the duct such that fresh air is drawn from the perimeter while contaminated air is drawn through the duct. This surrounding fresh air perimeter serves as an air barrier to contain and direct flow of contaminated air into the filter unit, minimizing bypass and leakage of contaminated air into the surrounding environment. A sealed filter system ensures that only air that has passed through the filter is allowed to exit from the cabinet. The filter is uniquely configured to allow maximum flow of air from the cooking area while ensuring proper odor and smoke removal. The filter contains a combination of paper and charcoal elements. A enclosable container for holding a supply of cooking oil is suspended from a supporting system and is held directly below the filter. This ensures that the draw of air through the filter by the fan and natural convection aid in the filtering process. The oil container is held out of contact with any outside surfaces of the cabinet, eliminating any accidental contact on the part of the operator. A fire extinguisher is automatically activated in case of fire in the apparatus.

One or more individual and separate food handling apparatus are disclosed. The food handling apparatus consists of an access door with an integral chute for automatically loading the product into the specially designed cooking baskets while eliminating accidental or even intentional contact with the cooking oil. The basket design acts as a loading mechanism, a funnel to direct food movement and as a cook basket. In the disclosed design, physical obstructions to product flow are eliminated and the attractive effect of surface tension of the cooking oil is minimized. The special design of the basket works with the natural flow tendencies of the food products to eliminate product sticking and to aid the loading and unloading processes. A direct drive system is disclosed to move the cooking baskets. In the Prior Art, many moving parts were needed where now, as disclosed, one suffices. This allows the load, cook, and unload functions to be accomplished more reliably and with less skill required for maintenance. Computer controlled circuitry controls the direct drive system and thereby controls the amount of time the cooking basket and food products are in the cooking oil. At a predetermined time, the cooking basket is raised from the cooking oil to a position which dispenses the cooked food into a funnel assembly positioned over a container to receive the cooked food.

The fire extinguisher extinguishes any fire in the cooking oil. When the fire extinguisher is activated by a fire, power is automatically cut to the self venting automatic food frying and dispensing apparatus. The power is also cut if the fire extinguisher is damaged. An over temperature control removes power to the cooking oil if the cooking oil becomes hotter than a predetermined value.

Among the advantages of the present invention is the high reliability, ease of maintenance, simplicity of design, safety to user and effective air filter systems. The present invention allows cooking to occur in an inside area without need for an external exhaust. The present invention facilitates deep-fat frying of food without exposing the individual to hot cooking oil. The present invention allows simultaneous cooking of one or more separate batches of food which are started, timed and controlled independently. The present apparatus provides a minimum of components for high reliability and jam-free operation.

Examples of the more important features of this invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto. Other features of the present invention will become apparent with reference to the following detailed description of a presently preferred embodiment thereof in connection with the accompanying drawing, wherein like reference numerals have been applied to the elements, in which:

DETAILED DESCRIPTION OF THE INVENTION

Figure 1:
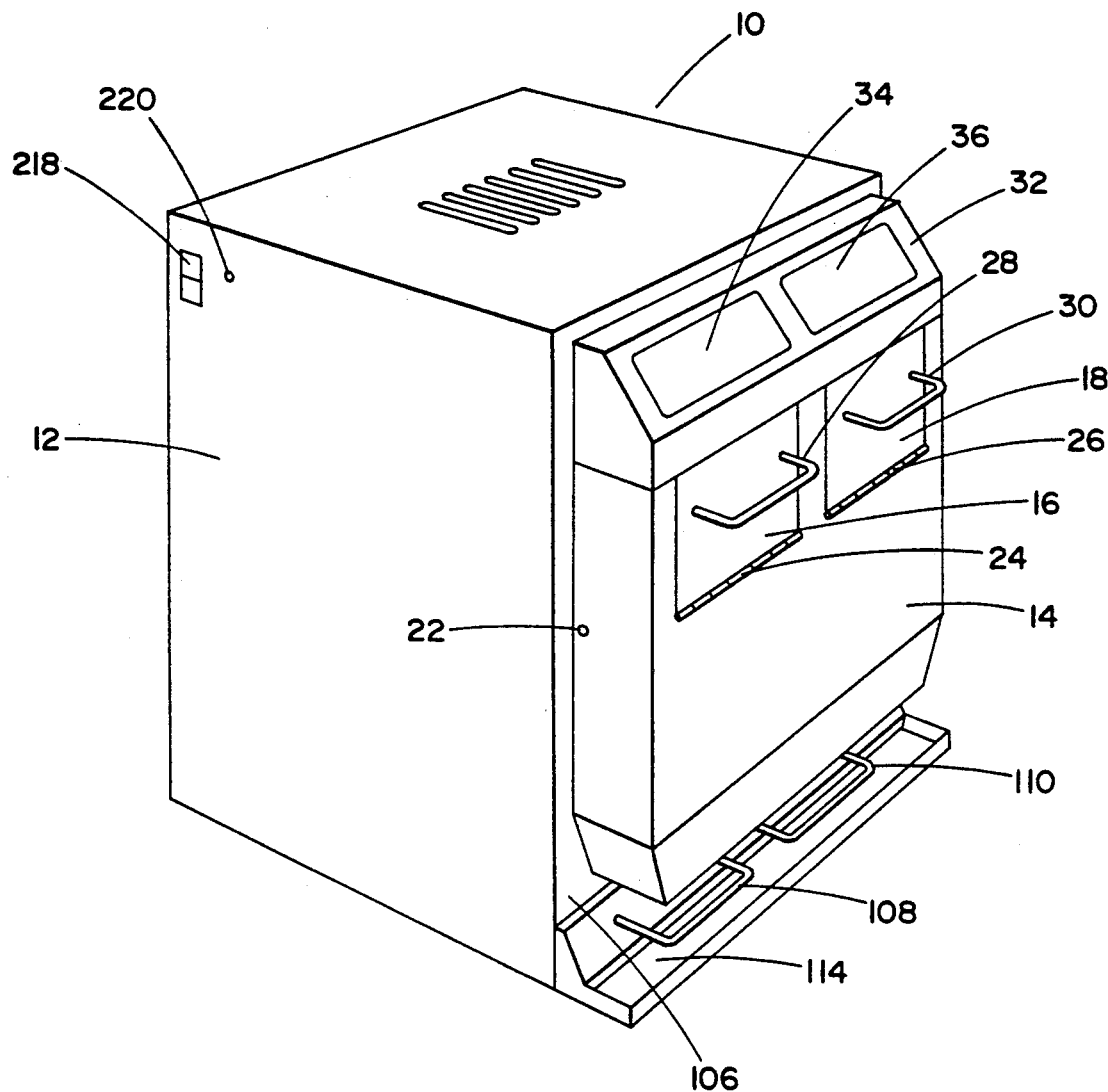
FIG. 1 is a simplified perspective view of the self venting automatic food frying and dispensing apparatus according to the present invention.
Figure 2:
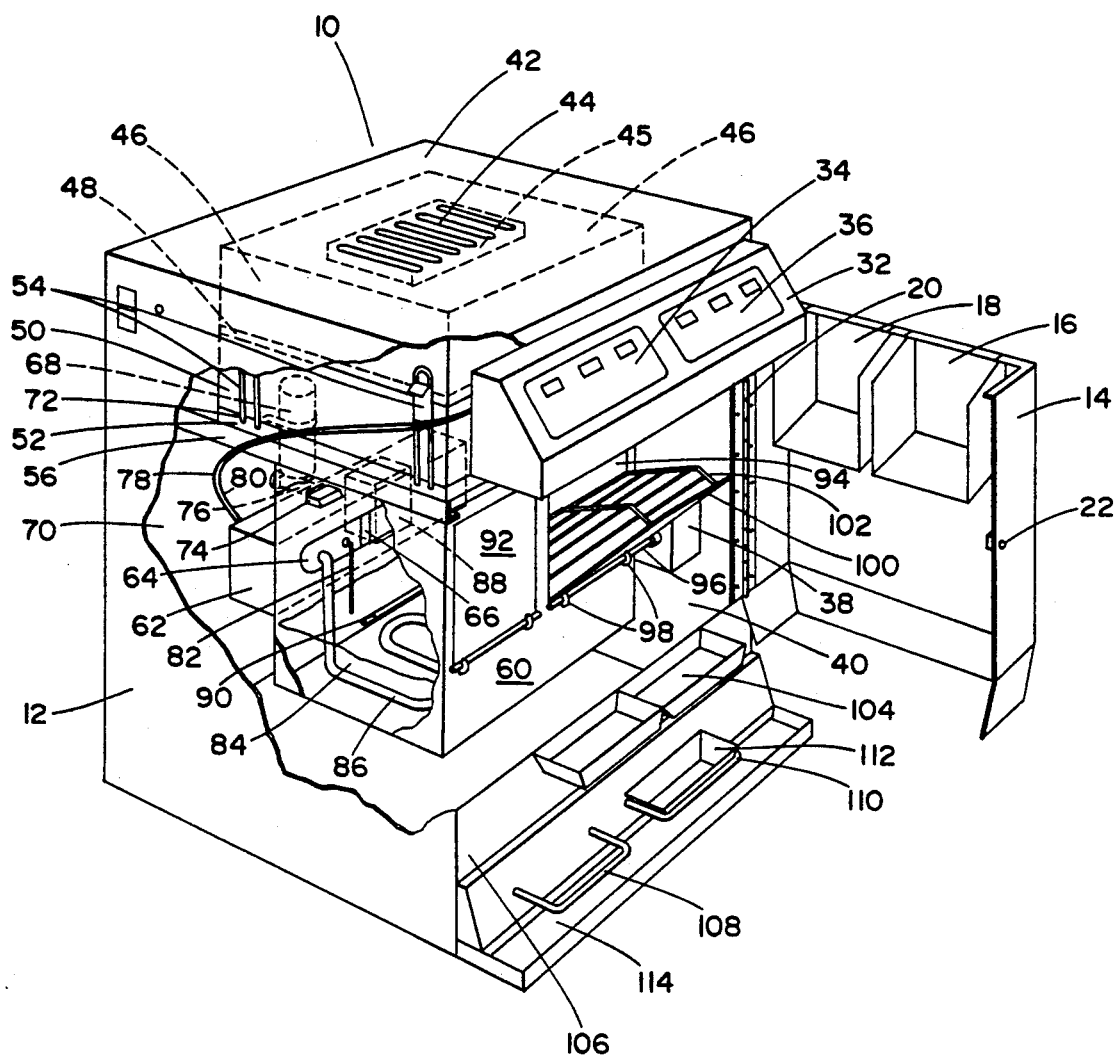
FIG. 2 is a simplified perspective view of the self venting automatic food frying and dispensing apparatus according to present invention with portions of the cabinet being displaced to expose the apparatus to view.

Referring to the drawing, particularly FIGS. 1 and 2, self venting automatic food frying and dispensing apparatus according to present invention is generally referred to by reference numeral 10. The self venting automatic food frying and dispensing apparatus 10 includes an upright cabinet which is generally rectangular in shape in side profile. Access to the inside portions of upright cabinet 12 is provided by various means which include a front panel 14 and first food loading door 16 and second food loading door 18. Front panel 14 is attached to cabinet 12 by hinge means 20 and secured by lock mechanism 22. First food loading door 16 and second loading door 18 are attached by first hinge means 24 and second hinge means 26 respectively to front panel 14 such that first food door 16 or second food door 18 may pivot downward to a generally horizontal position. First handle means 28 and second handle means 30 are attached to first food loading door 16 and second food loading door 18 respectively.

Control panel housing 32 contains microprocessor control system (not shown), safety systems (not shown) and first control panel 34 and second control panel 36.

First motor box 38 is attached to the inside surface of side panel 40.

Cabinet top 42 includes air outlet openings 44 of predetermined size, shape and number. Fan assembly 45, shown in phantom, is attached to the underside of cabinet top 42 such that the exhaust opening of fan assembly 45, is aligned with air outlet openings 44.

Exhaust plenum 46 (in one embodiment) comprising a box, rectangular in side view, open at both top and bottom, fastened to the underside of cabinet top 42 such that fan assembly 45 is enclosed on four sides. The contact points between exhaust plenum 46 and cabinet top 42 are sealed with a predetermined amount of a predetermined sealing compound (not shown) to create an air tight seal. A removable one piece gasket, filter seal 48 (shown in FIG. 2 in phantom) underlies exhaust plenum 46 and overlies removable filter unit 50. Oil container support frame 52 is removably attached to exhaust plenum 46 by support coupling means 54. First oil container support rail 56 and second oil container support rail 58 (shown in FIG. 3) support oil container 60. Heater assembly box 62 enters oil container through aperture 64 of predetermined size shape and position in oil container 60. Heater assembly box 62 is held in position by retainer 66. The area contained within the oil container 60 is the cooking area. Fire extinguisher 68 (shown in phantom) is attached to back panel 70 by fastening means 72. Head and sensor portion 74 extends through aperture 76 into oil container 60. When head and sensor portion 74 senses a fire, the fire extinguisher 68 is automatically activated to extinguish the fire. Power wire 78 and themocouple wire 80 operatively engage controlled components in heater assembly box 62. Power wire 78 and thermocouple wire 80 are operatively connected to circuitry in control panel housing 32 and to heater assembly box 62. Thermocouple 82 is operatively connected to thermocouple wire 80 and is positioned in heater assembly box 62 such that the distal end is covered in cooking oil 84. Heater element 86 is positioned in heater assembly box 62 such that the distal end of the element is covered in cooking oil 84. Over temperature controller 88 (in phantom) is located in heater assembly box 62 with the capillary tube and sensor 90 extending through an aperture in heater assembly box 62 and connected with a clip or keeper under heater element 86. Over temperature controller 88 is operatively connected between capillary tube and sensor 90, power wire 78 and heater element 86.

First cooking basket aperture 92 and second cooking basket aperture 94 in oil container 60 are of predetermined size, shape and position. Motor assembly (not shown) is removably attached to basket drive shaft 96 (only one shown). Basket dive shaft supports 98 support basket dive shaft 96 for rotational movements. Basket support plate 100 is attached to basket drive shaft 96. Basket 102 is removably attached to basket support plate 100 such that rotational movement exerted on basket dive shaft 96 by motor assembly (not shown) will cause rotation of basket support plate 100 and basket 102.

Food chute assembly 104 is removably attached to support plate 106. Food chute 104 assembly comprising stainless steel sheet formed into a predetermined size and generally funnel shaped. First food container support bar 108 and second food container support bar 110 hold food container 112 in operative position to capture food products (not shown) on completion of cooking cycle. Any crumbs or oil that spill over during unloading process at completion of cooking cycle are caught in spill tray 114.

Figure 3:
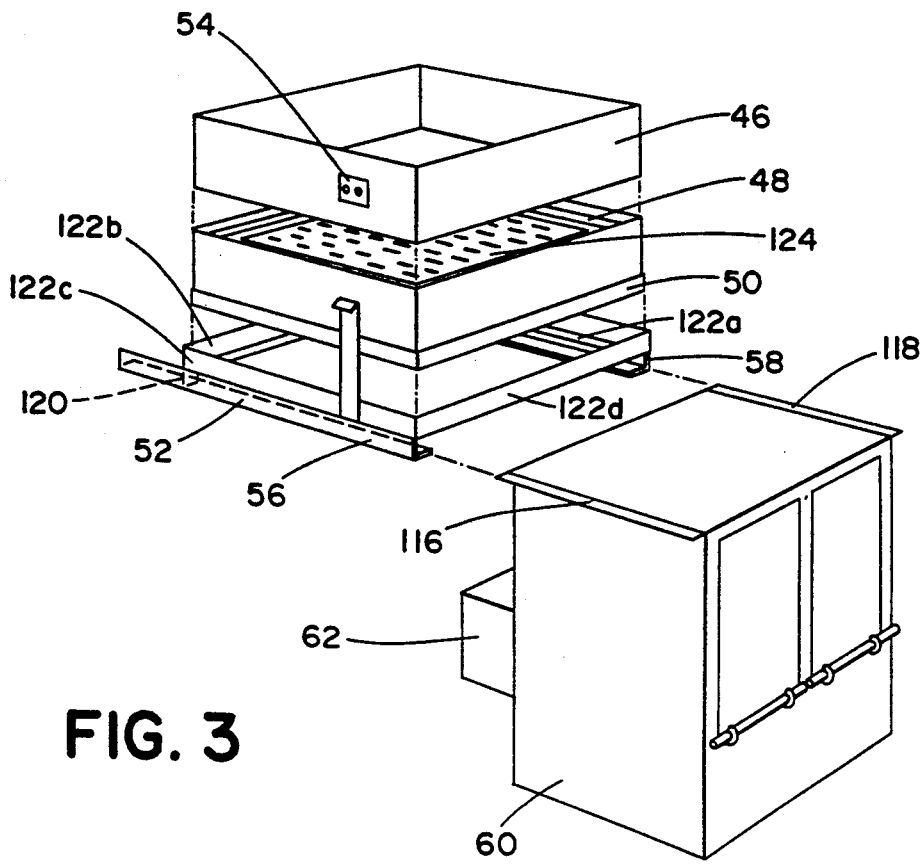
FIG. 3 is a simplified perspective view of the details of the integrated filter and oil container support system according to present invention.

FIG. 3 discloses details of an exploded assembly view of the relationship between the exhaust plenum 46, the filter seal 48, the filter unit 50, the oil container support frame 52 and the oil container 60. First integral support flange 116 and second integral support flange 118 extend from the top of oil container 60 and overlie and slideably contact first oil container support rail 56 and second oil container support rail 58 respectively. Oil container 60 is pushed back until contact is made with stop 120. Filter unit drops down into oil container support frame 52 and comes into contact 30 with and is supported by support bars 122a, 122b, 122c and 122d. Filter seal 48 overlies and rests against filter surface 124. Filter surface 124 is recessed a predetermined amount from the surface of filter unit 50. Exhaust plenum 46 slides into recessed portion of filter unit 50 and contacts filter seal 48. Support coupling means 54 attached between the exhaust plenum and the oil container support frame 52 pull the oil container support frame 52 upward against the force of gravity, supporting the oil container 60, the heater assembly box 62, and the filter unit 50 with sufficient force to deform slightly filter seal 48 and form an air tight seal. The open top of oil container 60 is held by container support frame 52 in close proximity to filter means 50. This configuration allows the vertical sides of the oil container 60 to channel fumes and smoke into the central area of filter means 50 while fresh air is drawn from around the perimeter, containing the smoke and fumes and directing them into the filter means 50.

Figure 4:
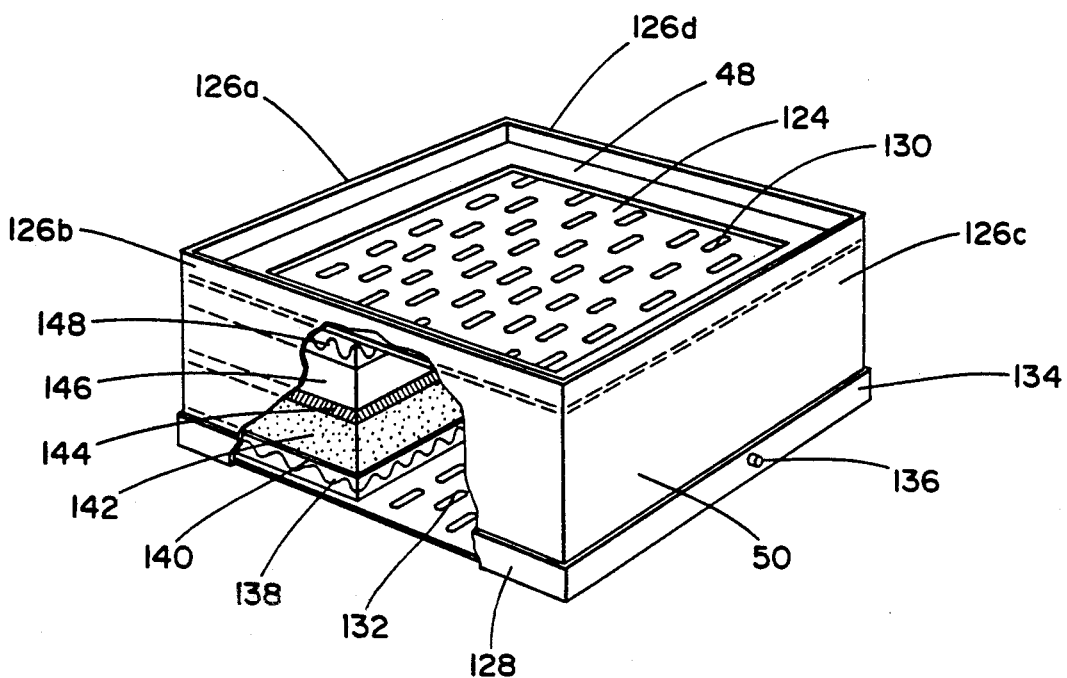
FIG. 4 is a simplified perspective view of the filter system according to present invention with portions of the container being displaced to expose the apparatus to view.

With reference to FIG. 4 the removable filter unit 50 is disclosed. Filter means 50 (in one embodiment) comprises a box, rectangular in side view with a perforated top portion 124 recessed a predetermined amount, leaving side panels 126a, 126b, 126c, and 126d equal amounts beyond perforated top portion 124, and perforated filter bottom portion 128. Perforations 130 in perforated top portion 124 are of a predetermined size, shape, number and location. Filter bottom portion 128 uses perforations 132 of predetermined size shape, number and location to allow the inward flow of air to the filter unit 50. Filter bottom portion 128 is flat in shape with the edges 134 bent upward to form a friction fit around the outside of box sides 126a, 126b, 126c and 126d Fastening means 136 at the side of filter unit 50 further secures the filter bottom portion 128 to the filter unit 50. Overlying and being supported by the perforated bottom portion 128 is pleated paper element 138 of predetermined size and shape. Overlying and being supported by pleated paper element 138 is a first flat paper element 140 of predetermined size and shape. Overlying and being supported by first flat paper element 140 is a predetermined amount of first activated charcoal 142. Overlying and being supported by first activated charcoal 142 is a second flat paper element 144 of predetermined size and shape. Overlying and being supported by second flat paper element 144 is second activated charcoal 146. Overlying and being supported by the second activated charcoal 146 is a retainer element 148 of a highly compressible non-woven material (in present embodiment polyester is used) of predetermined size and shape. Smoke and vapors generated by the cooking process are drawn through the filter unit 50 by fan assembly 45 and cleared of particulate matter at pleated paper element 138. First flat paper element 140 serves to clear particulate matter and to slow air passage through first activated charcoal 142, allowing maximum initial fume scrubbing to occur. Second flat paper element 144 serves to further restrict and slow air passage to allow maximum final fume scrubbing in second activated charcoal 146. Retainer element 148 serves to hold second activated charcoal 146 in position when compressed by filter bottom portion 128 and secured using fastening means 136. The flat lying attitude of the filtering layers takes advantage of the forces created by gravity and the vibration of fan assembly 45 to create tighter packing of the activated charcoal over time. This design keeps filter efficiency at a maximum by ensuring that an equal thickness of activated charcoal is present throughout the entire filter. The design also allows maximum residence time of fume laden air in the activated charcoal, resulting in a maximum amount of surface adsorption of fumes by the activated charcoal. The filter unit 50 may be easily replaced and the filter components contained therein may also be easily replaced when they become clogged and dirty.

Figure 5:
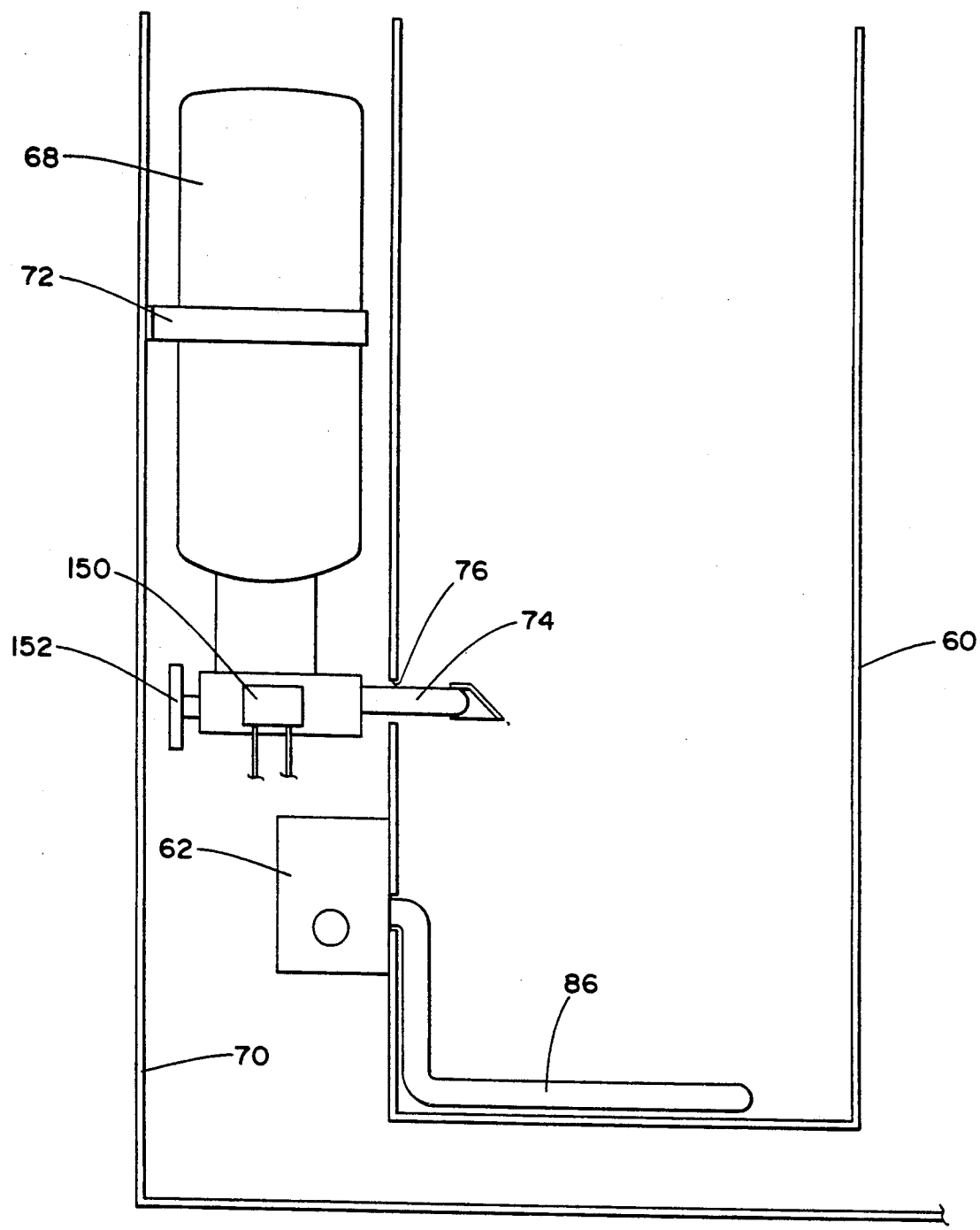
FIG. 5 is simplified side view of the oil container and oil heating apparatus and fire extinguisher system according to present invention with portions of the cabinet and oil container being displaced to expose the apparatus to view.

With reference to FIG. 5, details of the fire extinguisher 68, are disclosed. Fire extinguisher 68 is attached to back panel 70 by fastening means 72. Head and sensor portion 74 extends through aperture 76 into oil container 60. When head and sensor portion 74 senses a fire, the fire extinguisher 68 is automatically activated to extinguish the fire. Pressure switch 150 is operatively connected to control circuitry (not shown). In the event of discharge or leakage, pressure switch 150 is disconnected and the self venting automatic food frying and dispensing apparatus 10 is disabled. Pressure gauge 152 serves as a visual indicator of the pressure inside fire extinguisher 68.

Figure 6:
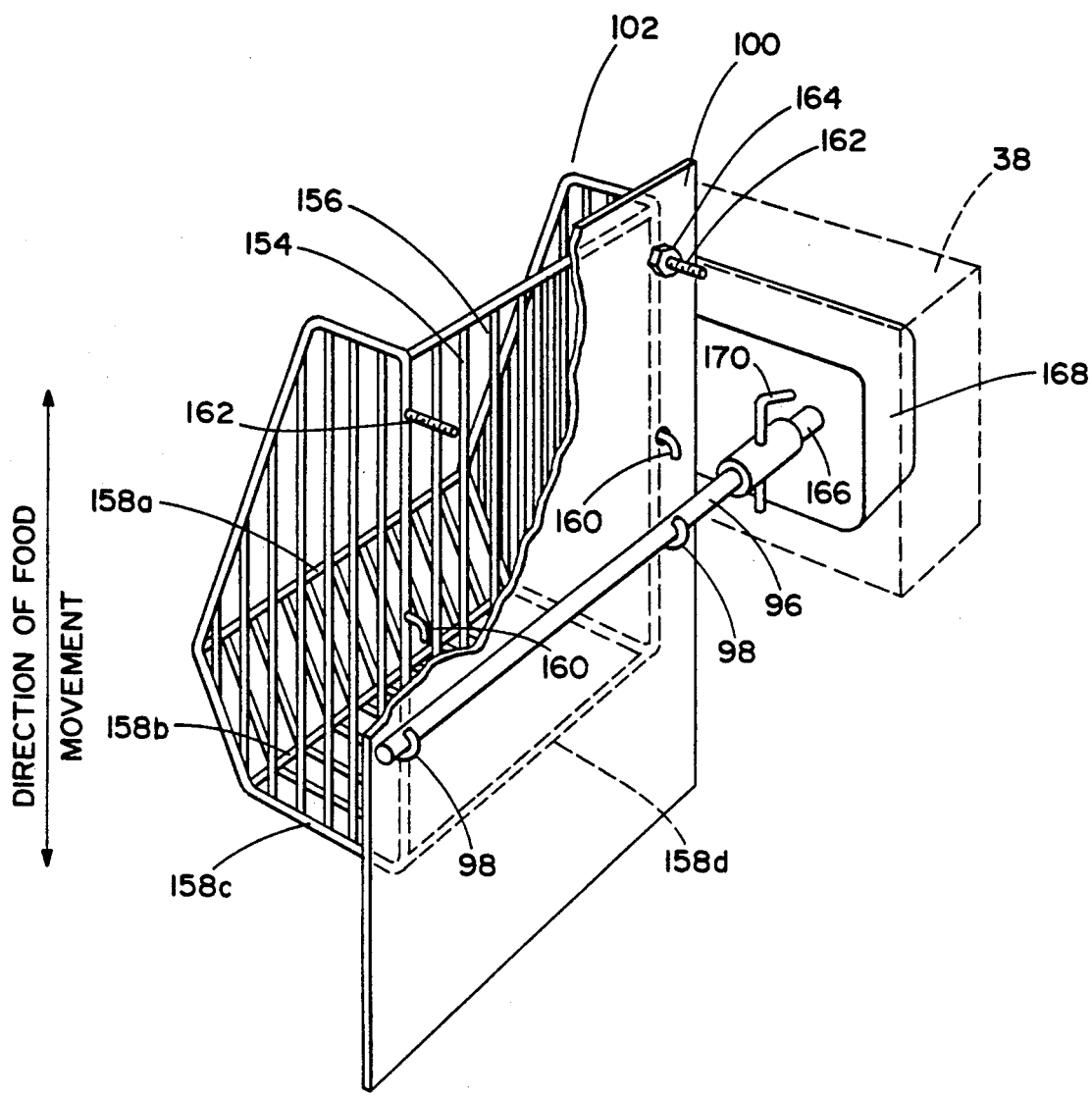
FIG. 6 is a simplified perspective view of details of motor drive, cooking basket and basket coupling assembly of the present invention with portions thereof cutaway.

With reference to FIG. 6, details of basket 102 and basket drive system are disclosed. Basket 102 is of predetermined size and shape. Basket bars 154 are of predetermined size and are arranged substantially parallel to the direction of food movement. Spaces 156 defined by basket bars 104 are held to less than ½ inch. Cross bars 158a, 158b, 158c, and 158d are for strength and reinforcement and are attached to the external faces of basket 102. First basket attachment means 160 comprises a clip means attached to basket 102 in a predetermined location. Attachment means 160 removably attaches basket 102 to basket support plate 100. Second basket attachment means 162 comprises a threaded stud of a predetermined size attached to basket 102 in a predetermined location. Second basket attachment means secured with nut 164. Basket drive shaft supports 98 support basket drive shaft 96. Basket drive shaft 96 is removably attached to drive shaft 166 of reversible DC motor 168 by securing means 170. Reversible DC motor 168 removably mounted inside motor drive box 38 (shown in phantom) with drive shaft 166 protruding so as to be in operative alignment with securing means 170.

Figure 7:
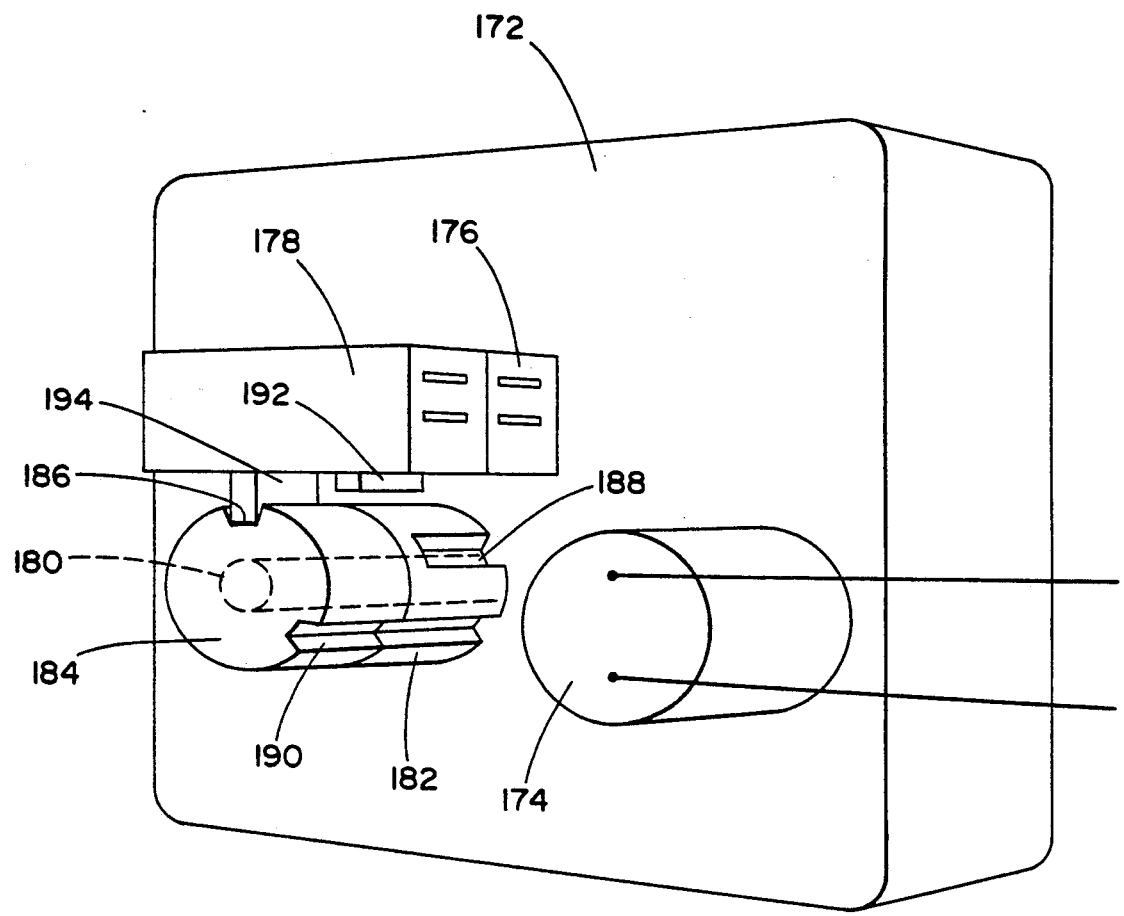
FIG. 7 is a simplified perspective view of details of the motor drive switching mechanism of the present invention.

With reference to FIG. 7, means for rotating basket drive shaft 96 and thereby changing position of basket 102 to allow loading of food products into basket 102, lowering of basket 102 into cooking oil 84 for a predetermined time and then raising basket 102 out of the cooking oil 84 and discharging food products into food tray 112 is disclosed and comprises a gear box 172 containing a predetermined number of reduction gears (not shown) operatively connected between a reversible DC motor 174 and drive shaft 166. The reversible DC motor 174 is attached to the left side of gear box 172 as are two microswitches 176 and 178. Protruding through the wall of gear box 172 and operatively positioned with respect to the microswitches 176 and 178 is a rotatable shaft 180 (shown in phantom) which is driven by the reduction gears in gear box 172. Mounted on rotatable shaft 180 to rotate therewith are sleeves 182 and 184. Sleeve 182 includes cutout or depression 186 and sleeve 184 includes cutouts or depressions 188 and 190. The depression or release of switch levers or reeds 192 and 194 by sleeves 182 and 184 or depressions 186, 188 or 190 result in microswitches 176 and 178 being activated and/or inactivated. Microswitches 176 and 178 act as position sensors to inform the control circuitry (not shown) of the position of basket 102 and the control circuitry decides the appropriate polarity of DC drive voltage to be applied to the reversible DC motor 174 to control the direction of rotation thereof.

Figure 8:
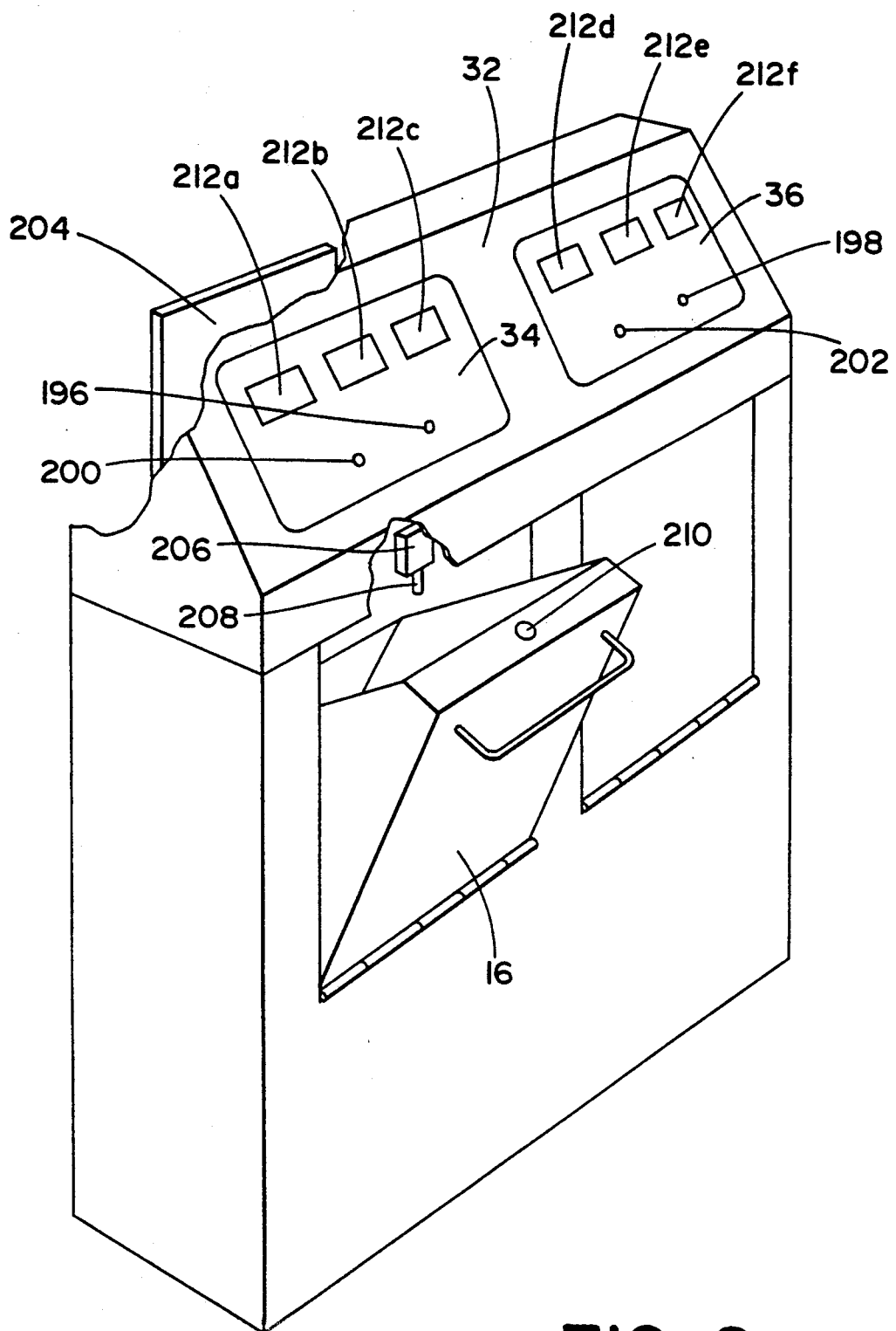
FIG. 8 is a simplified perspective view of the control panel housing, and front panel of the present invention with portions of the housing being displaced to expose the apparatus to view.

With reference to FIG. 8, details of control panels 34 and 36 for self venting automatic food frying and dispensing apparatus 10 are disclosed. Wait lights 196 and 198 and ready lights 200 and 202 are operatively connected to control circuitry 204. Wait lights 196 and/or 198 lit when the self venting automatic food frying and dispensing apparatus 10 is not ready for use. When the control circuitry 204 determines that the self venting automatic food frying and dispensing apparatus 10 is ready for use, ready lights 200 and/or 202 are lit and wait lights 196 and/or 198 are extinguished. Solenoid 206 is operatively connected to and controlled by control circuitry 204. When determined by the control circuitry 204, solenoid 206 is activated and plunger 208 is withdrawn from aperture 210 in food loading door 16, allowing door 16 to be opened and food products to be loaded thereby. Once the operator loads the food products into the self venting automatic food frying and dispensing apparatus 10 and closes door 16, a cooking time 212a, 212b, 212c, 212d, 212e, or 212f is selected by depressing the appropriate switch. All time switches 212 are operatively connected to the control circuitry 204 and select different cooking times. Once the appropriate cooking time selection is made, wait lights 196 and/or 198 are lit and ready lights 200 and/or 202 are extinguished. Solenoid 206 is deactivated and plunger 208 re-enters aperture 210 of door 16, locking door 16 for the remainder of the cook cycle. When the cooking cycle has been completed and food products returned to the operator, the control circuitry extinguishes wait lights 196/and or 198 and lights ready lights 200 and/or 202 in preparation for the next cycle.

Figure 9:
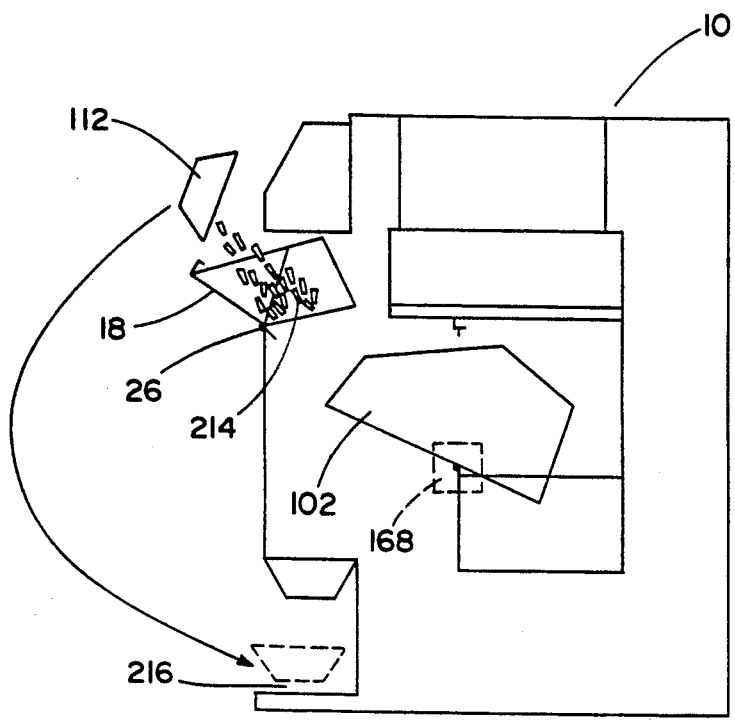
FIG. 9 is a simplified geometric view of key elements of the first stage of the food loading mechanism according to present invention.

With reference to FIG. 9, the geometry of the food loading cycle is detailed. Food loading door 18 is opened, pivoting on hinge 26 and food products 214 are poured into the self venting automatic food frying and dispensing apparatus 10 and food tray 112 is placed into position at the unloading station 216. Basket 102 is held in load position by motor drive 168 (shown in phantom).

Figure 10:
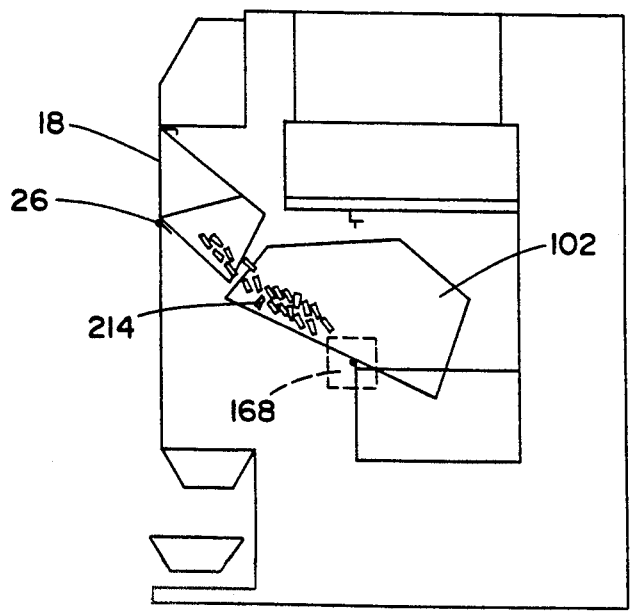
FIG. 10 is a simplified geometric view of key elements of the second stage of the food loading mechanism according to present invention.

With reference to FIG. 10, food loading door 18 is closed, pivoting along hinge 26. Food products 214 spill out of food loading door 18 and come to rest in basket 102, which is still being held in load position by motor drive 168 (shown in phantom).

Figure 11:
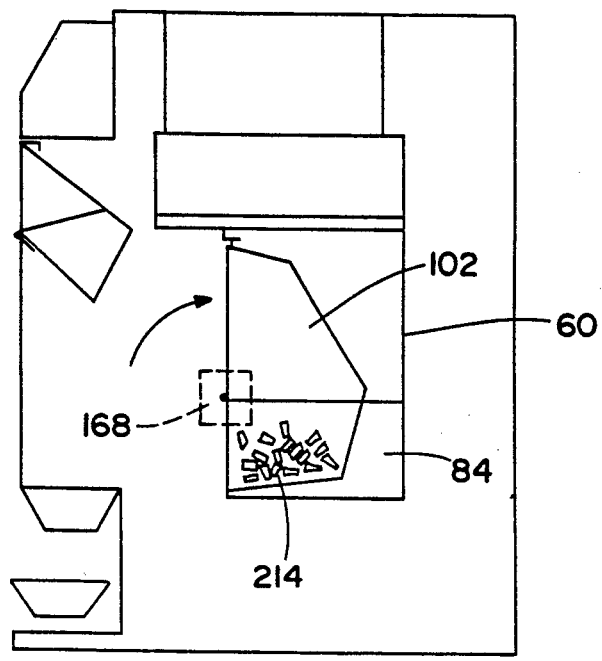
FIG. 11 is a simplified geometric view of key elements of the cooking stage mechanism according to present invention.

With reference to FIG. 11, when an appropriate cook time is selected (not shown), control circuitry (not shown) applies a predetermined electrical voltage to predetermined controlled components of motor drive 168 and basket 102 is rotated into cook position. Predetermined sensing devices (not shown) on motor drive 168 (shown in phantom) communicate to the control circuitry (not shown) that the basket 102 is in cook position. Food products are maintained in the cooking oil 84 contained within oil container 60 for a predetermined period of time.

Figure 12:
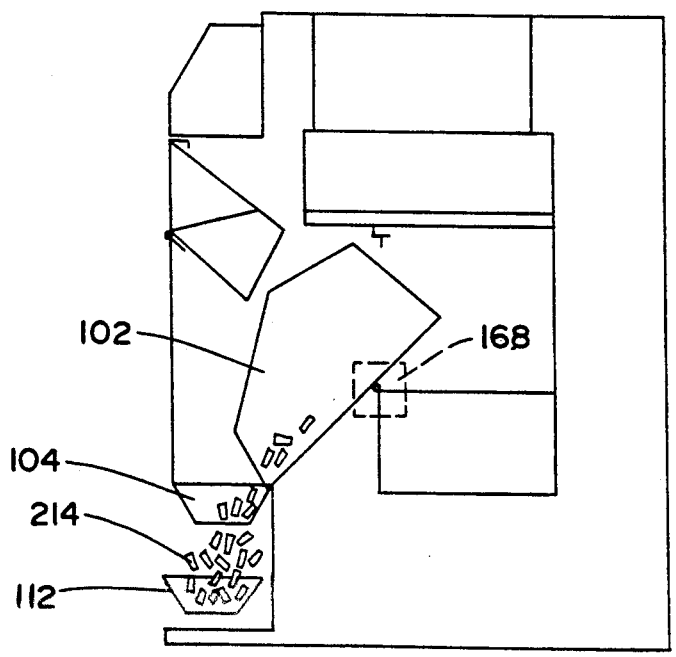
FIG. 12 is a simplified geometric view of key elements of the food unloading mechanism according to present invention.

With reference to FIG. 12 the predetermined cooking time has expired, and a predetermined electrical voltage is applied to predetermined controlled components of motor drive 168 and basket 102 is rotated to a predetermined unload position. Food products 214 spill out of basket 102 and are guided by unloading chutes 104 into food tray 112.

Figure 13:
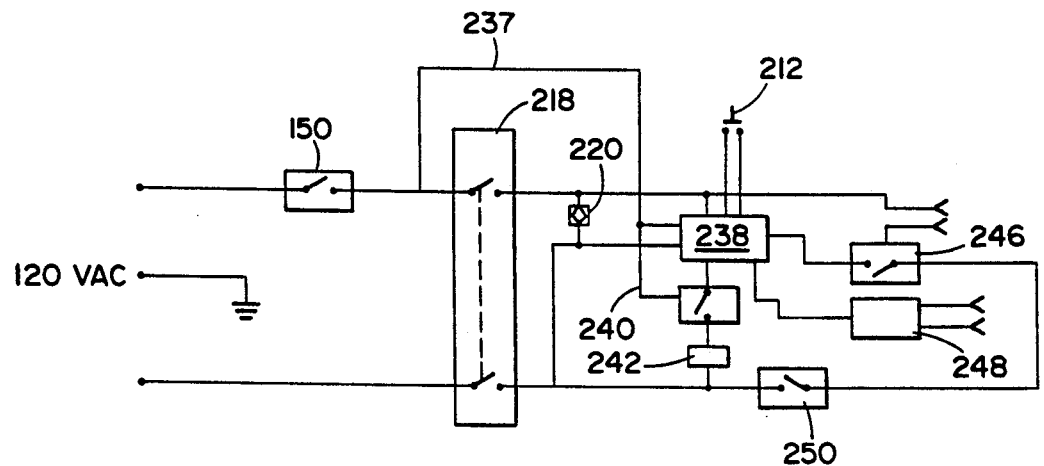
FIG. 13 is a simplified schematic diagram of the electrical power and safety elements of the present invention.

With reference to FIG. 13, the electrical portion of the self venting automatic food frying apparatus 10 for activating various elements and for removing power for safety reasons under predetermined conditions is shown. Switch means 150 is associated with fire extinguisher 68 and is normally closed. Switch means 150 is opened when the head and sensor portion 74 senses a fire in the self venting automatic food frying and dispensing apparatus 10 and power is removed. Main power switch 218 provides the manual means for applying power to or removing power from the self venting automatic food frying and dispensing apparatus 10. Main power light 220 lets the operator know when power is applied to the self venting automatic food frying and dispensing apparatus 10. Lead 237 ties microprocessor 238 and switch means 240 to power. Microprocessor 238 controls switch means 240 which controls motor 242 in fan assembly 45, allowing fan assembly 45 to run for a predetermined time after main power switch 218 is turned off. Switch means 246 is operatively connected to heater element 86 and is controlled by microprocessor 238 and is normally closed. When the temperature of the oil container 60 just meets or exceeds a predetermined temperature, temperature sensor circuit 248 feeds data to microprocessor 238 which deactivates switch means 242, removing power from heater element 86. When the temperature of oil container 60 drops below a predetermined temperature, temperature sensor circuit 248 feeds data to microprocessor 238 which activates switch means 242, applying power to heater element 86. The continued cycling will keep cooking oil 84 within proper limits for cooking food products. Switch means 250 is associated with over temperature controller 88 and will remove power from heater element 86 if the temperature of the cooking oil 84 exceeds a predetermined value. Timer switch array 212 (which includes switches 212a, 212b, 212c, 212d, 212e and 212f) is operatively connected to microprocessor 238.

Figure 14:
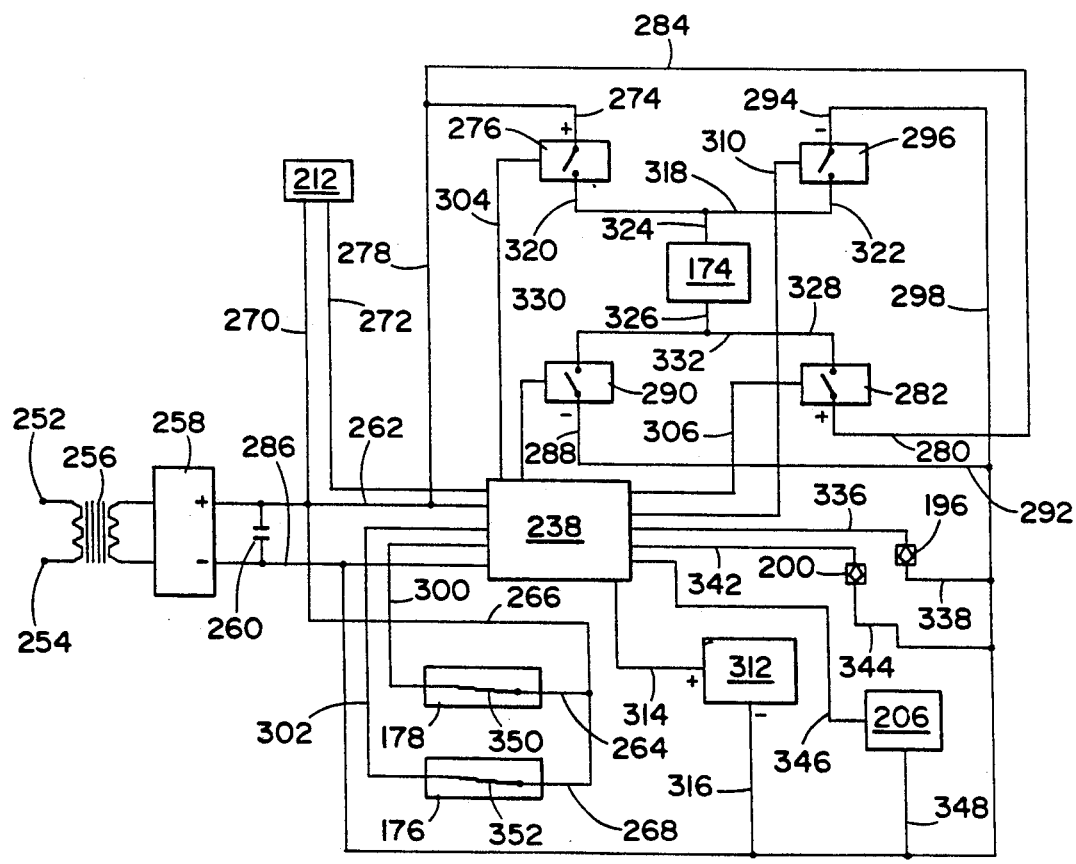
FIG. 14 is a simplified schematic diagram of the microprocessor control system of the present invention.

With reference to FIG. 14, the electrical portion of the mechanism to automatically lower and raise the cooking basket 102 of the self venting automatic food frying and dispensing apparatus 10 is shown. Input voltage of 110 volts AC is applied to the primary transformer 256 via terminals 252 and 254. The output (approximately 24 volts AC) is applied to a full wave bridge rectifier 258 whose DC output is applied across filter capacitor 260. The positive output of full wave bridge rectifier 258 is applied to microprocessor 238 via lead 262; to terminal 264 of microswitch 178 via lead 266; to terminal 268 of microswitch 176 via lead 266; to timer switch array 212 (for illustration purposes only one is shown) via lead 270; to terminal 274 of switch means 276 via lead 278 and to terminal 280 of switch means 282 via lead 284. The negative output of full wave bridge rectifier 258 is applied to microprocessor 238 via lead 286; to terminal 288 of switch means 290 via lead 292; and to terminal 294 of switch means 296 via lead 298. Microprocessor 238 is tied to timer switch array 212 via lead 272; to wiper 350 inside microswitch 178 via lead 300; to wiper 352 inside microswitch 176 via lead 302; to switch means 276 via lead 304; to switch means 282 via lead 306; to switch means 290 via lead 308 and to switch means 296 via lead 310 Positive terminal of buzzer 312 is tied to microprocessor via lead 314 and negative terminal of buzzer 312 is tied to the negative output of full wave bridge rectifier 258 via lead 316. Terminal 324 of reversible DC motor 174 is tied to terminal 320 of switch means 276 and terminal 322 of switch means 296 via lead 318. Terminal 326 of reversible DC motor 174 is tied to terminal 328 of switch means 282 and terminal 330 of switch means 290 via lead 332. The positive terminal of wait light 196 is tied to microprocessor 238 via lead 336. The negative terminal of wait light 196 is tied to the negative output of full wave bridge rectifier 258 via lead 338. The positive terminal of ready light 200 is tied to microprocessor 238 via lead 342. The negative terminal of ready light 200 is tied to the negative output of full wave bridge rectifier 258 via lead 344. The positive terminal of solenoid 206 is tied to microprocessor 238 via lead 346. The negative terminal of solenoid 206 is tied to the negative output of full wave bridge rectifier 258 via lead 348.

OPERATION

The self venting automatic food frying and dispensing apparatus 10 is a small compact unit which can easily be placed on a counter top in a convenience store or food service establishment. The apparatus can be plugged into any convenient outlet as it operates on 110 volt 15 amp AC source. With reference to FIGS. 1, 2, 13, and 14, at the beginning of a business day, an employee unlocks lock 22, swings open front panel 14 and checks to ensure that the proper amount of cooking oil 84 is present in oil container 60, adding if needed. The main power switch 218 is moved to the "on" position, which applies power to the circuitry control board 204, motor 242 in fan assembly 45, heater element 86 and main power light 220. Microprocessor 238 conducts a self test program to ensure that all systems are functioning properly and heating begins. If errors are encountered in any operational system, microprocessor 238 aborts start-up procedures and activates beeper 312 notifying operator of a failure in the system. Wait lights 196, 198 and door locking solenoid 206 (only one is shown) are activated by microprocessor 238 until self venting automatic food frying and dispensing apparatus 10 is fully operational. Fan assembly 45 draws air into the filter means 50 from the cooking area. The air would be drawn through the pleated paper element 138, through the first flat paper element 140, through the first activated charcoal 142, through the second flat paper element 144, through the second activated charcoal 146, through the retainer element 148 and into the exhaust plenum 46. Filter means 50 removes the smoke, particulates, fumes and odors from the cooking processes which take place in the oil container 60 of the self venting automatic food frying and dispensing apparatus 10 before the air is discharged back into the room through air outlet openings 44 by fan assembly 45. When cooking oil 84 has reached it's full operating temperature, wait lights 196 and 198 are extinguished, solenoid 206 deactivated, thereby unlocking door 16, and ready lights 200 and 202 are activated, and the self venting automatic food frying and dispensing apparatus 10 is ready to fry food. The operator opens door 16 and pours food products into self venting automatic food frying and dispensing apparatus 10, and then closes door 16. When door 16 is closed, the food products automatically load into basket 102 which is suspended out of the cooking oil 84. The cook cycle begins by the operator depressing one of the appropriate cook times, 212a, 212b, or 212c, which activates the cook program in the microprocessor 238. Solenoid 206 is energized by microprocessor 238, locking door 16. Ready light 200 is extinguished and wait light 196 is activated. Microprocessor 238 reads the time selected by the operator and begins the cook cycle by energizing lead 304, thereby activating switch means 276. Terminal 320 is activated and lead 318 becomes connected with the positive output of full wave bridge rectifier 258. Microprocessor 238 energizes lead 308, activating switch means 290. Terminal 330 is activated and lead 332 becomes connected with the negative output of full wave bridge rectifier 258. Reversible DC motor 174 starts to rotate in desired first direction to cause basket 102 to be lowered into cooking oil 84. When the reversible DC motor 174 begins to rotate, so do sleeves 182 and 184 and cutouts or depressions 186, 188, and 190. The reversible DC motor 174 continues to run until cut out or depression 186 is reached by switch lever 194, removing switch lever 194 from the surface of sleeve 184 and causing wiper 350 to break contact with terminal 264 thereby breaking a circuit. Microprocessor 238 detects this drop in voltage, and de-energizes leads 304 and 308 thereby deactivating switch means 276 and 290, stopping rotation of reversible DC motor 174. When the microprocessor 238 times out, lead 306 and lead 310 are energized, activating switch means 282 and 296 respectively. Switch means 296 connects terminal 322 and hence lead 318 to negative output of full wave bridge rectifier 258. Switch means 282 connects terminal 328 and hence lead 332 to the positive output of full wave bridge rectifier 258. Reversible DC motor 174 begins to rotate in a desired second and opposite direction, and cooking basket 102 is raised out of the cooking oil 84. As reversible DC motor 174 rotates in a second and opposite direction, so do sleeves 182 and 184, and cutouts or depressions 186, 188, 190. Switch lever 194 leaves cutout or depression 186, causing wiper 350 to contact terminal 264, thereby reconnecting the circuit. Microprocessor 238 detects this increase in voltage and is programmed to ignore it. Rotation of the reversible DC motor 174 in the second desirable direction continues. Cutout or depression 188 is reached by switch lever 192 of microswitch 176, removing switch lever 194 from the surface of sleeve 182 and causing wiper 352 to break contact with terminal 268 thereby breaking a circuit. Microprocessor 238 detects this drop in voltage and is programmed to ignore it. Rotation of the reversible DC motor 174 in the second desirable direction continues. As basket 102 rotates back the food products are drained. Basket 102 rotates into the unload position, where the food products slide out of the basket, though the food chute assembly 104 where they are directed to a pre-positioned food tray 112. At this time, rotation of reversible versible DC motor 174 in the second desired direction has resulted in cutout or depression 190 being reached by switch lever 194 of microswitch 178, removing switch lever 194 from the surface sleeve 184 and causing wiper 352 to break contact with terminal 268 thereby breaking a circuit. Microprocessor 238 is programmed to recognize this drop in voltage and de energizes leads 306 and 310, thereby deactivating switch means 296 and 292 and stopping rotation of reversible DC motor 174. Microprocessor 238 activates buzzer 312, notifying operator that food products have been delivered for consumption. Microprocessor 238 energizes leads 304 and 308, activating switching means 276 and 290. Rotation of the reversible DC motor 174 begins again in the first desired direction. As rotation continues, cutout or depression 188 is again reached by switch lever 192 of microswitch 176, removing switch lever 192 from the surface of sleeve 182 and causing wiper 350 to break contact with terminal 266 thereby breaking a circuit. Microprocessor 238 detects this drop in voltage and is programmed to recognize this as load position and de-energizes leads 304 and 308, stopping rotation. Microprocessor 238 conducts another self test cycle, and if all systems are operational, solenoid 206 is de-energizes, allowing door 16 to be opened, wait light 196 is extinguished and ready light 200 activated in preparation for the next cooking cycle. At the end of a business day, the operator or attendant moves main power switch 218 to the off position. Microprocessor 238 continues to apply power to motor 242 in fan assembly 45 for a predetermined time to cool off the oil and operating systems, then automatically shuts off.

Although the present invention has been described in conjunction with specific form thereof, it is evident that many alternatives, modifications and variations will be apparent to those skilled in the art of the foregoing disclosure. Accordingly, this description is to be construed as illustrative only and is for the purpose of teaching those skilled in the manner of carrying out the invention. Various changes may be made in the shape, size and arrangement of parts. It will be appreciated that various modifications, alternatives, or variations may be made without departing from the spirit and scope of the invention as defined in the appended claims.

What is claimed is

1. Self venting automatic food frying and dispensing apparatus adapted for use in an enclosed space without connection to an outside exhaust system, said apparatus comprising:
   a cabinet adapted to be supported at a suitable working height and having a predetermined number of panels, at least one of said panels being configured to allow access to the interior of said cabinet;
   a container positioned within said cabinet for holding a supply of cooking oil;
   means for heating said container;
   means for supporting food products positioned within said cabinet;
   means for automatically loading food products into said means for supporting food products;
   means for holding said means for supporting food products in a load position suspended above said cooking oil while said food products are being loaded therein;
   means for an operator to select a length of time for the product to be cooked;
   means integral with said means for holding for automatically moving said means for holding, and hence, said means for supporting food products, from said load position into the supply of cooking oil to a cook position, maintaining said cook position and moving said means for supporting to a discharge position;
   blower means positioned within said cabinet for circulating air through the self venting automatic food frying and dispensing apparatus along a predetermined path and exiting at a predetermined location;
   an air filter means positioned in said predetermined path, and;
   a sealing means positioned within said cabinet coupling said filter means to said cabinet whereby an airtight seal results.

2. The apparatus of claim 1 wherein said filter means comprising a box of predetermined size and shape with removable perforated bottom and with a secure perforated top, said top being recessed a predetermined amount, said box containing a predetermined number of alternating filter media elements and activated charcoal elements arranged in a substantially flat lying attitude, whereby the forces of vibration of said blower means and gravity increase the packing of said alternating layers of filter media elements and activated charcoal and thus increase filter efficiency.

3. The apparatus of claim 1 wherein said means for supporting food products comprising a basket of predetermined size and shape with at least one surface being configured to allow access to the interior of said basket, the body of said basket being formed by rods of predetermined size and shape, said rods oriented with long axes substantially parallel to the direction of movement of food products into and out of said means for supporting, openings between said rods of a predetermined size, cross member means of predetermined size and shape attached on non-interior surfaces of said means for supporting food thereby allowing the unencumbered movement of food products into and out of said means for supporting food products.

4. The apparatus of claim 1 wherein said cabinet having a bottom panel configured such that said self venting automatic food frying and dispensing apparatus is prevented from overturning when tipped through an angle of approximately 10 degrees from the horizontal.

5. Self venting automatic food frying and dispensing apparatus adapted for use in an enclosed space without connection to an outside exhaust system, said apparatus comprising:
   a cabinet adapted to be supported at a suitable working height and having a predetermined number of panels, at least one of said panels being configured to allow access to the interior of said cabinet;
   an enclosable container positioned within said cabinet for holding a supply of cooking oil;
   means for heating said container;
   means for enclosing said container under predetermined conditions;
   means for supporting food products positioned within said cabinet;
   means for automatically loading food products into said means for supporting food products;
   means for holding said means for supporting food products in a load position suspended above said cooking oil while said food products are being loaded therein;
   means for an operator to select a length of time for the product to be cooked;
   means integral with said means for holding for automatically moving said means for holding, and hence, said means for supporting food products, from said load position into the supply of cooking oil to a cook position, maintaining said cook position and moving said means for supporting to a discharge position;
   blower means positioned within said cabinet for circulating air through the self venting automatic food frying and dispensing apparatus along a predetermined. path and exiting at a predetermined location;
   an air filter means positioned in said predetermined path, and;
   a sealing means positioned within said cabinet coupling said filter means to said cabinet whereby an airtight seal results.

6. The apparatus of claim 5 further including a digitally based control means for monitoring and controlling at least one operating system.

7. The apparatus of claim 5 further including a non-digitally based temperature limiting control means separate from (the apparatus of claim 8) said digitally based control means whereby failure of said digitially based control means will not result in overheating or fire.

8. The apparatus of claim 6 wherein said digitally based control means comprising at least one microprocessor programmed to conduct tests of at least one operational system.

9. The apparatus of claim 6 wherein said digitially based control means operatively connected to warning means whereby operator is alerted in event of failure or fire.

10. The apparatus of claim 6 wherein said digitally based control means further including flameproof raceway means for encasing said control means whereby fire will not disable said digitally based control means.

11. The apparatus of claim 5 wherein said enclosable oil container comprising a vat of predetermined size and shape with at least one means of access to the interior.

12. The apparatus of claim 5 wherein said means for enclosing comprising a door of predetermined size and shape, said door positioned to removably cover access means in said container, said door removably cover access means in said container, said door removably attached to said means for supporting food products, said door removably attached to said means for automatically lowering said means for supporting food products whereby said door is in a closed position when said means for supporting is moved to a cook position whereby escape of oil or odors during the cook process is minimized.

13. The apparatus of claim 5 wherein said self venting automatic food frying and dispensing apparatus further including an air barrier means whereby fumes from oil and cooking are directed into said filter system, said air barrier comprising a duct means of predetermined size shape for directing cooking odors and fumes to said filter unit, said duct means terminating at the inlet of said filter unit, said duct means substantially smaller than said inlet of said filter unit, said duct means located substantially centrally to said inlet thereby maintaining a perimeter of inlet surrounding said duct means whereby the action of said blower assembly drawing air through said inlet, draws contaminated air through said duct means and fresh air from said perimeter, whereby air flow from said perimeter confines, contains and directs said contaminated air drawn from said duct means into said filter.

14. The apparatus of claim 5 further including oil container support means to hold said container out of direct contact with said cabinet.

15. The apparatus of claim 5 further including automatic blower timer means to allow said blower to operate for a predetermined length of time after said apparatus is turned off.

16. The apparatus of claim 5 wherein said means for automatically loading foods products comprising:

an integral door and chute of predetermined size, said integral door and chute means comprising a vertical panel of predetermined size and shape with a second panel of predetermined size and shape appended to a predetermined edge of said vertical panel to form a syncline into which food products can be placed and remain at rest when said vertical panel is moved to a substantially vertical position at which time said food products slide out of said integral door and chute and into said means for supporting food products thereby eliminating the need for guiding devices to control the flow of food products, and;

said integral door and chute configured such that a human hand is unable to enter said cabinet and contact the cooking oil when said integral door and chute is in other than a closed position.

* * * * *